Oct. 3, 1967  A. F. TREES  3,344,731
SEASONING APPARATUS
Filed Feb. 10, 1965
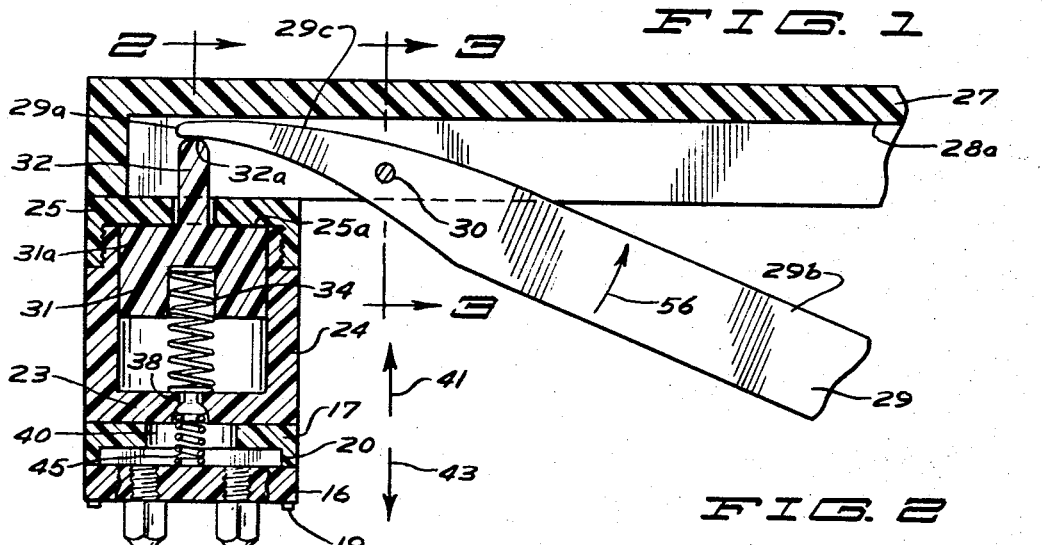
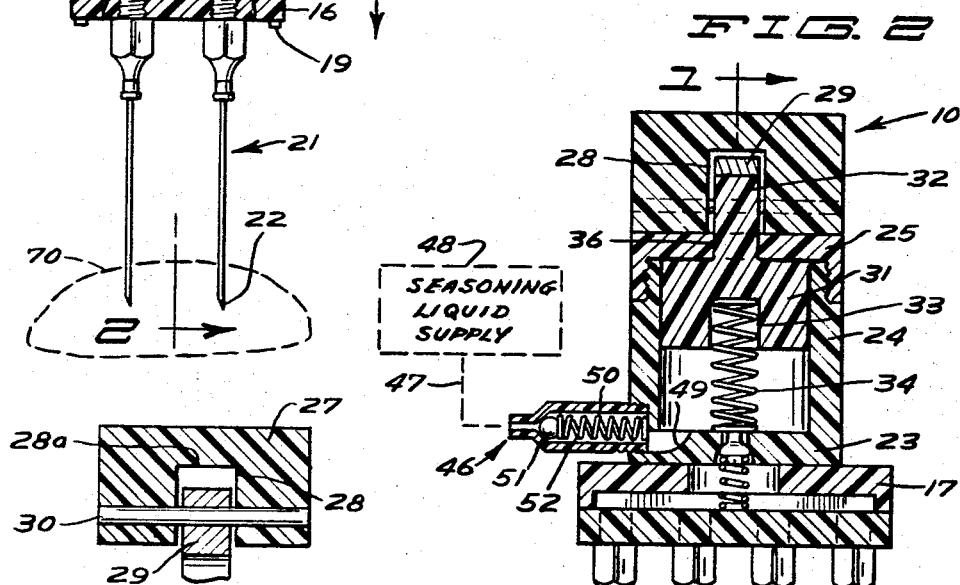
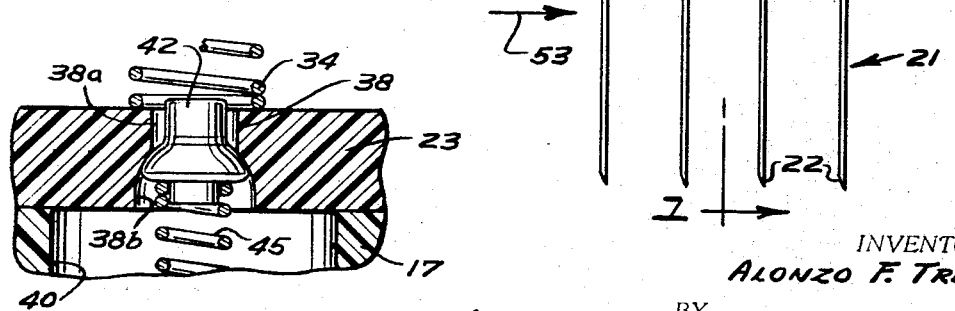
INVENTOR.
ALONZO F. TREES
BY Dugger Braddock Johnson & Westman
ATTORNEYS United States Patent Office 3,344,731
Patented Oct. 3, 1967

3,344,731
SEASONING APPARATUS
Alonzo F. Trees, 1710 Center St. North Cedar,
Cedar Falls, Iowa 50613
Filed Feb. 10, 1965, Ser. No. 431,574
7 Claims. (Cl. 99—257)

This invention relates to new and novel seasoning apparatus. More particularly this invention relates to new and novel hand held seasoning apparatus for injecting appropriate type seasonings such as salt, steak sauce, etc. into meat, fowl, or fish preparatory to subjecting a particular food item to heat for processing said food item to be eaten.

A conventional method of seasoning food prior to subjecting it to heat has been to sprinkle or rub the seasoning over the outer surface of the food before it is further processed. However this is not satisfactory since the seasoning material does not penetrate into the flesh any substantial distance and as a result the outer surface may be adequately seasoned but the interior portions of the flesh are not properly seasoned. On the other hand if a single hypodermic syringe together with the hypodermic needle is to be used for injecting seasoning into flesh to be further processed for eating, the food will be sufficiently seasoned at the point of injection and insufficient seasoning at areas surrounding the point of injection, or on the other hand, be over seasoned at the point of injection and not sufficient seasoning on the other areas of flesh. Additionally using such hypodermic apparatus is relatively cumbersome and further requires an undue amount of time. In order to overcome problems of the aforementioned nature, this invention has been made.

One of the objects of this invention is to provide a new and novel hand held seasoning device for injecting salt, steak sauce, and/or other appropriate seasonings into the flesh of meat, fowl, or fish that is to be further processed before eating. Another object of this invention is to provide a new and novel hand operated seasoning device that will simultaneously inject appropriate seasoning material into several different portions of the flesh to be treated.

An additional object of this invention is to provide a new and novel hand held seasoning device incorporating as a part thereof, a pump unit operable by the hand holding the device for injecting seasoning material into the food.

Still another object of this invention is to provide a new and novel hand held seasoning device that simultaneously injects seasoning material into several spaced portions of the food to be processed and which is inexpensive to manufacture and easy to operate.

Other and further objects are those inherent in the invention herein illustrated, described, and claimed, and will become apparent as the description proceeds.

To the accomplishment of the aforegoing and related ends, this invention then comprises features hereinafter fully described and particularly pointed out in the claims, the following description setting forth in detail certain illustrative embodiments of the invention, these being indicative, however, of but a few of the various ways in which the principles of the invention may be employed.

The invention is illustrated by reference to the drawings in which corresponding numerals refer to the same parts, and in which:

FIGURE 1 is a longitudinal cross sectional view generally taken along the line and in the direction of the arrows 1—1 of FIGURE 2, said view showing the seasoning device of this invention in a datum condition;

FIGURE 2 is a transverse cross sectional view generally taken along the line and in the direction of the arrows 2—2 of FIGURE 1 and additionally schematically illustrates the device connected to a source of liquid containing seasoning;

FIGURE 3 is a transverse cross sectional view generally taken along the line and in the direction of the arrows 3—3 of FIGURE 1 to show the mounting of the pump lever on the handle; and FIGURE 4 is an enlarged cross-sectional view of a portion of the structure of FIGURE 1 to more clearly show the valving between the cylinder chamber and the manifold chamber.

The seasoning device of this invention, generally designated 10, includes a generally rectangular bottom plate 16, a generally rectangular top plate 17 that has a rectangular cut out, and nuts and bolts 19 for retaining said members in an assembled relationship with the rectangular cut out opening to the bottom plate to provide a manifold chamber 20. A plurality of hollow needle members, generally designated 21, are appropriately secured to the bottom plate to extend generally perpendicular to the bottom surface thereof and are located to provide a plurality of rows. Advantageously the needle members are mounted so that the pointed portions are located in right angle rows wherein the spacing of the longitudinal and transversely extending rows is the same. Each of the needle members has a sharp point 22, the opposite end of each needle member opening into the manifold chamber 20. Joined to the top plate to extend upwardly thereabove is an open top cylinder having a bottom wall 23 that is attached to the top plate and centrally located relative thereto, and an upwardly extending tubular wall 24 that at its lower edge is integrally joined to the bottom wall 23. The upper end of the tubular wall is threaded to threadingly receive the cylinder cover 25.

Joined to the upper surface of the cover 25 is a horizontally elongated handle 27 which extends generally radially relative an extension of the central vertical axis of the tubular wall 24, and is of a shape and size to be conveniently held in the users hand. The handle for the major portion of its length has a horizontally elongated slot 28 whereby the handle in transverse cross section is of inverted U-shape (see FIGURE 3).

A pump lever 29 is pivotally connected to the handle 27 by a pivot member 30 attached to the handle and extending longitudinally through the U-shaped slot at a location radially outwardly of the tubular wall 24. The pump lever is pivotally movable from a datum position as illustrated in FIGURE 1 wherein the top surface 29c of the forward end portion 29a abuts against the adjacent surface of the top wall 28a of the slot 28 and the rearward end portion 29b is spaced a substantial distance vertically beneath surface 28a, to a position that the forward end 29a is spaced a substantial distance vertically beneath handle surface 28a and the top surface of the rearward end portion of the pump lever abuts or substantially abuts against the surface 28a. In order to permit this movement, the top surface 29c of the pump lever from adjacent its forward edge to a location substantially horizontally rearwardly of the pivot 30 is arcuately curved such as shown in FIGURE 1.

Mounted within the cylinder for axial movement is a piston 31. The lower end of a generally vertically extending stud 32 is integrally joined to the top surface of the piston, there being an axially extending cylindrical bore 33 axially opposite the stud and opening through the bottom surface of the piston. One end of a coil spring 34 bears against the top surface of the bore 33, the opposite end of said spring bearing against the top surface of the bottom wall 23 whereby the piston is resiliently urged to move axially to a position to have the top surface 31a thereof abut against the bottom circular surface 25a of the cover. It is to be noted that the cover is provided with a central aperture 36 of a diameter to have the stud 32 extend upwardly therethrough. The axial height of the stud is sufficiently great that when the piston top surface 32a bears against the bottom surface 25a of the cover, the curved upper end 32a of the stud 32 in bearing against the bottom surface of the forward end portion 29a of the pump lever, will resiliently retain the pump lever in the datum position illustrated in FIGURE 1. The curved upper end 32a of the stud in conjunction with the arcuately curved bottom surface of the forward end portion of the pump lever cooperatively act to minimize the frictional forces of said surfaces sliding relative one another when the pump lever is pivoted from its datum position to a position that the top surface of the rearward end portion 29b of the pump lever abuts or substantially abuts against the top wall 28a of the handle slot.

In order to provide for fluid communication between the cylinder and the manifold chamber 20, the cylinder bottom wall 23 has an axial valve bore 38. The upper axial end portion 38a of the bore 38 opens into the cylinder and is of a reduced diameter while the lower end portion 38b is of a greater diameter. Enlarged diametric portion 38b is placed in fluid communication with the manifold chamber 20 through the centrally located aperture 40 formed in the top plate. To block fluid flow from the manifold chamber 20 in the direction of the arrow 41 through the valve bore 38 to the cylinder chamber there is provided a check valve that includes a valve member 42 that is resiliently held against the valve seat formed adjacent the juncture of the enlarged diametric portion of the valve bore with the reduced diametric portion. The valve member is resiliently held in the valve seated position by a coiled spring 45 that at one end bears against the valve member and is extended through the aperture 40 to, at the opposite end, bear against the top surface of the bottom plate 16. Accordingly the valve member 42 will block any substantial fluid flow from the manifold chamber 20 upwardly to the cylinder chamber; however, whenever fluid in a cylinder chamber is pressurized sufficiently to overcome the spring characteristics of coil spring 45, the valve member 42 is moved downwardly under fluid pressure to permit the flow of fluid from the under fluid pressure to permit the flow of fluid from the cylinder chamber to the manifold chamber.

The seasoning device is provided with a one way acting check valve 46 having an axially elongated valve bore that at one end is adapted to be placed in fluid communication with the cylinder bore and is connected to one end of the tubular line 47. The opposite end of the line 47 is submerged below the level of liquid containing seasoning in the container 48. The valve bore of the check valve 46 is in fluid communication with the aperture 49 formed in the cylinder bottom wall 23, aperture 49 opening to the cylinder chamber through the top surface of said bottom wall.

In order to prevent any substantial flow of fluid from the cylinder chamber through the check valve 46 to the container 48 but permit fluid flow in the opposite direction, the check valve bore 50 is of reduced diameter at the end adjacent tubular line 47 and of an enlarged diameter at the end that opens to the aperture 49. The juncture of the aforementioned reduced diameter portion and enlarged diameter portion of the bore 50 provides a valve seat against which a valve member 51 is resiliently held by a coil spring 52 having one end bear against said valve member. The coil spring is located in bore 50 and at the opposite end bears against the tubular wall 24 such as shown in FIGURE 2 to resiliently hold the valve member in a valve seated condition. As a result of providing of check valve 46, when the negative pressure within the cylindrical chamber exerts a force less than the spring force of spring 52, the fluid flow path between the cylinder chamber and container 48 is blocked. However, when the pressure in the cylinder chamber is less than that on the liquid in the container by an amount greater than the spring force and the head pressure required to draw fluid through line 47, the valve member 51 is moved in the direction of the arrow 53 to permit fluid flow from the container through line 47, check valve 46, and aperture 49 into the cylinder chamber.

The structure of the invention having been described, the use thereof will now be set forth. In using the apparatus of this invention, the type of seasoning to be used together with the carrier, which in most cases will be water, is placed in the receptacle 48. In the event that the type of seasoning to be injected into fowl or meat 70 (see FIGURE 1) is salt, the salt may be added to the water in the desired amount. For example, for certain types of meat or fowl that are seasoned, it has been found that 16 tablespoons of salt per one pint of water is quite adequate, although, obviously for different people the amount would vary. Also if other seasoning is to be added, it can be placed in the saline solution, it being understood that for the purposes of the invention the carrier would have to be the type that the seasoning either forms suspension therewith or goes into the solution.

In using the seasoning device 10, first the tubular member 47 is at one end connected to check valve 46 and at the opposite end is placed in liquid communication with the liquid in the container 48. Now the hand grip portion is manually gripped and moved to push the needles 21 into the interior of the food 70 which is to be seasoned. This may be done by having the palm of the hand bear against the top surface of the handle above the cylinder and the fingers bearing against the tubular wall. Thereupon, with the rearward end of the hand grip portion held in the hand such that the fingers extend around the rearward end of the pump lever, manual pressure is exerted against the pump lever to cause it to pivot in the direction of the arrow 56 from the datum position of FIGURE 1 to a position that the top surface thereof substantially abuts against the slot top wall 28a. This pivotal movement of the pump lever, through the forward end portion 29a bearing against the studs 32, forces the piston downwardly in the direction of the arrow 43 to pressurize the fluid and/or liquid in the cylinder chamber thereatbeneath. Since the aforementioned pressure on the fluid in the chamber acts in the same direction as the spring force of spring 52 against the valve member 51, the fluid in the cylinder chamber is prevented from being forced outwardly through the check valve 46. However the aforementioned pressurizing fluid in the cylinder chamber acts against the valve member 42 in a direction opposite that exerted by the coil spring 45, and when the pressure is sufficiently great, moves the valve member 42 away from its valve seat so that fluid flow will flow from the cylinder chamber to the manifold chamber until the pressure in the cylinder chamber has sufficiently decreased that the valve 42 is again moved to its seated position. Now the manual gripping pressure on the pump lever is released.

Upon releasing the gripping pressure on the pump lever, the coil spring 34 acting against the piston moves the piston in the direction of the arrow 41 until its top surface 31a abuts against the cover bottom surface 25. This through the stud 32 forces the forward end portion of the pump lever upwardly whereby the pump lever is pivoted about pivot member 30 in a direction opposite arrow 56.

The movement of the piston in the direction of 41 creates a vacuum in the bottom portion of the cylinder chamber, which acts on the valve member 42 to move it in the same direction as the urging by spring 45, whereby gas or liquid in the manifold chamber 20 is prevented from moving into the cylinder chamber. However the same vacuum force acts on the valve member 51 in a direction opposite the force of spring 52, and when sufficiently great, moves valve member 51 in the direction of the arrow 53 so that the vacuum in the cylinder chamber is applied through the tubular line 47 to the liquid in container 48. The application of the vacuum through line 47 draws liquid upwardly into the cylinder chamber until the vacuum pressure is dropped sufficiently that the spring force of the spring 52 overcomes the vacuum force on member 51 and thereupon the valve member 51 moves to a seated position. The gripping pressure is again exerted on the pump lever to cause it to pivot in the direction of the arrow 56 whereby the liquid in the cylinder chamber is forced downwardly into the manifold chamber and thence released whereby liquid is drawn from the container 48 into the cylinder chamber in the manner previously described. This pumping action is continued a sufficient number of times that the desired quantity of seasoning material is injected into the food 70. Subsequently the seasoning device is withdrawn from the food 70 and again reinserted in the manner previously described until the food 70 has been sufficiently seasoned. In this connection it is to be noted that in the event there is liquid in both the cylinder chamber and the manifold chamber when the needles 21 are withdrawn, substantially no liquid will dip from the needles and the liquid will not flow out of the cylinder chamber since the springs 45 and 52 will resiliently retain the valve members 42 and 51 respectively in the valve seated positions.

An advantage of this invention is that it has a self contained pumping unit for pressurizing the liquid flowing therethrough to force liquid to move through the needles 21 into the food to be seasoned and that it is of a construction for home use.

Other advantages of using the seasoning device of this invention is that the housewife can through a few simple operations season an entire piece of meat in a short period of time. Additionally due to the provision of a plurality of needles on a manifold, a substantial area of food may be seasoned in a single operation. Also the seasoning is injected into the interior of the food so that it will be substantially evenly seasoned throughout. It is to be understood that the seasoning device of this invention can be modified for seasoning larger pieces of meat in a single operation by providing a manifold chamber of a larger area and a greater number of needles mounted in the bottom plate 16 to open into the manifold chamber. Although not essential it is preferred that members 16, 17, 24, 25, 27, 42 and 51 are made of plastic, particularly if saline solution is to be injected into the food.

Also it is to be mentioned that the hand grip portion 27 conveniently fits within the grasped hand and thus the seasoning device may be firmly held in the hand outwardly of tubular wall 24 and at the same time the pump lever operated with the same hand.

As many widely apparently different embodiments of this invention may be made without departing from the spirit and scope thereof, it is to be understood that I do not limit myself to the specific embodiments herein.

What I claim is:

1. Apparatus for seasoning foods such as meat, fish and fowl comprising a cylinder having a cylinder chamber, said cylinder having a tubular wall, a cover at one axial end of said tubular wall and a bottom wall at the opposite axial end of said tubular wall, means forming a manifold chamber attached to said bottom wall, a plurality of hollow needles mounted on said manifold means to open into the manifold chamber, a piston mounted in said cylinder chamber for movement axially between the cover and the bottom wall, means in the cylinder for resiliently urging the piston toward the cover, said cover having an aperture and said piston having a stud extending outwardly through said aperture, a pump lever, handle means joined to said cover and mounting said pump lever for pivotal movement to force said piston from adjacent the cover to adjacent the bottom wall, said manifold means and bottom wall cooperatively forming a valve bore, check valve means mounted in the aforementioned valve bore for permitting fluid flow from the cylinder chamber to the manifold chamber when the piston is moved toward said bottom wall and blocking fluid flow when the piston is moving from the bottom wall toward the cover, and check valve means mounted on the cylinder in fluid communication with the cylinder at a location adjacent the bottom wall to permit fluid flow into the cylinder chamber when the piston moves toward the cover and preclude fluid flow in the opposite direction therethrough.

2. The structure of claim 1 further characterized in that said handle means extends radially outwardly of said tubular wall at an elevation above said tubular wall.

3. The structure of claim 2 further characterized in that said handle means has a radially elongated U-shaped slot and that said lever is mounted on the handle means to extend into said slot.

4. The structure of claim 2 further characterized in that said stud having an end portion outwardly of said cover, said stud end portion having a curved surface, and that said lever has an arcuate curved portion for slideably abutting against said stud curved surface.

5. Apparatus for seasoning foods such as meat, fish and fowl comprising a cylinder having a cylinder chamber, said cylinder having a tubular wall, a cover at one axial end of said tubular wall, said cover having an aperture therethrough opening to said cylinder chamber, and a bottom wall at the opposite end of said tubular wall, means attached to said bottom wall for forming a manifold chamber, said manifold means and bottom wall cooperatively having a valve bore opening to said cylinder chamber and said manifold chamber to place said chambers in fluid communication with one another, a plurality of hollow needles mounted on said manifold means to open into the manifold chamber, a piston member having a piston within said cylinder chamber that is axially movable from a position adjacent to the cover to a position adjacent the bottom wall, and a portion joined to said piston that extends through the cover aperture, a handle mounted on said cylinder, a pump lever, means mounting said lever on said handle for movement to force the piston member to move the piston from adjacent the cover to adjacent the bottom wall, said lever mounting means comprising a pivotal connection between the lever and the handle, means acting against the piston member and cylinder for resiliently urging the piston toward the cover, first means in fluid communication with said cylinder chamber for supplying fluid and second means for permitting fluid flow through the first means to the cylinder chamber and preventing fluid flow from the manifold chamber to the cylinder chamber as the piston is moved from adjacent the bottom wall to adjacent the cover, and preventing fluid flow from the cylinder chamber through the first means and permitting fluid flow from the cylinder chamber to the manifold chamber as the piston moves from adjacent the cover to adjacent the bottom wall, said second means including valve means mounted adjacent said valve bore for controlling fluid communication between the manifold chamber and the cylinder chamber in the above mentioned manner.

6. Apparatus for seasoning foods such as meat, fish and fowl comprising a cylinder having a cylinder chamber, said cylinder having a tubular wall, a cover at one axial end of said tubular wall, said cover having an aperture therethrough opening to said cylinder chamber, and a bottom wall at the opposite end of said tubular wall, means attached to said bottom wall for forming a manifold chamber that is fluidly communicable with said cylinder chamber, a plurality of hollow needles mounted on said manifold means to open into the manifold chamber, a piston member having a piston within said cylinder chamber that is axially movable from a position adjacent to the cover to a position adjacent the bottom wall, and an upper portion joined to said piston that extends through the cover aperture, said piston member upper portion comprising a stud having one end portion joined to said piston and an opposite curved end portion, a handle mounted on said cylinder, a pump lever, means mounting said lever on said handle for movement to force the piston member to move the piston from adjacent the cover to adjacent the bottom wall, said lever including a forward end portion having an arcuately curved surface for slidably bearing against said stud curved end portion to move the stud and thereby the piston member from adjacent the cover to adjacent the bottom wall, means acting against the piston member and cylinder for resiliently urging the piston toward the cover, first means in fluid communication with said cylinder chamber for supplying fluid and second means for permitting fluid flow through the first means to the cylinder chamber and preventing fluid flow from the manifold chamber to the cylinder chamber as the piston is moved from adjacent the bottom wall to adjacent the cover, and preventing fluid flow from the cylinder chamber through the first means and permitting fluid flow from the cylinder chamber to the manifold chamber as the piston moves from adjacent the cover to adjacent the bottom wall.

7. The structure of claim 6 further characterized in that said handle elongated end joined to said cover to extend radially outwardly therefrom in its direction of elongation, has a slot that opens to said cover aperture and is generally U-shaped in cross-section normal to the direction of elongation, said lever being pivotally connected to said handle to movably extend into said slot.

References Cited

UNITED STATES PATENTS

| | | | |
|---|---|---|---|
| 637,798 | 11/1899 | Johnson | 103—215 XR |
| 872,482 | 12/1907 | Tolman | 103—215 XR |
| 1,124,851 | 1/1915 | Burkle | 99—257 XR |
| 1,619,126 | 3/1927 | Hundemer | 222—256 |
| 1,968,383 | 7/1934 | Farrow | 103—215 XR |
| 2,670,673 | 3/1954 | Gordon et al. | 99—257 |
| 2,743,959 | 5/1956 | Nelson et al. | 239—331 XR |
| 3,080,809 | 3/1963 | Harris | 99—257 |

FOREIGN PATENTS

| | | |
|---|---|---|
| 152,519 | 7/1953 | Australia. |
| 903,323 | 2/1954 | Germany. |
| 898 | of 1881 | Great Britain. |

OTHER REFERENCES

Petersen, German application, 1,156,631, printed Oct. 31, 1963.

WALTER A. SCHEEL, *Primary Examiner.*

J. M. NEARY, *Assistant Examiner.*